(12) United States Patent
Bergemann et al.

(10) Patent No.: US 7,753,970 B2
(45) Date of Patent: Jul. 13, 2010

(54) POLYALKENE AMINES WITH IMPROVED APPLICATIONAL PROPERTIES

(75) Inventors: Marco Bergemann, Hockenheim (DE); Harald Schwahn, Wiesloch (DE); Dietmar Posselt, Heidelberg (DE); Erich K. Fehr, Vellmar (DE); Thomas Wettling, Limburgerhof (DE); Klaus Diehl, Hassloch (DE); Helmut Schmidtke, Bensheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1221 days.

(21) Appl. No.: 10/550,910

(22) PCT Filed: Mar. 31, 2004

(86) PCT No.: PCT/EP2004/003425

§ 371 (c)(1),
(2), (4) Date: Sep. 28, 2005

(87) PCT Pub. No.: WO2004/087808

PCT Pub. Date: Oct. 14, 2004

(65) Prior Publication Data

US 2007/0094922 A1 May 3, 2007

(30) Foreign Application Priority Data

Apr. 1, 2003 (DE) ................ 103 14 809

(51) Int. Cl.
*C08L 23/26* (2006.01)
(52) U.S. Cl. ........................................ 44/412
(58) Field of Classification Search ........... 44/421
See application file for complete search history.

(56) References Cited

U.S. PATENT DOCUMENTS

| | | | | |
|---|---|---|---|---|
| 3,700,595 | A | * | 10/1972 | Kaiser .................... 252/62.56 |
| 4,832,702 | A | * | 5/1989 | Kummer et al. ................ 44/412 |
| 4,849,572 | A | | 7/1989 | Chen et al. |
| 4,877,416 | A | | 10/1989 | Campbell |
| 6,099,602 | A | * | 8/2000 | Roper et al. .................. 44/412 |
| 6,281,173 | B1 | * | 8/2001 | Tanaka et al. ................ 508/110 |

FOREIGN PATENT DOCUMENTS

| | | |
|---|---|---|
| DE | 27 02 604 | 7/1978 |
| DE | 38 26 608 | 2/1990 |
| DE | 38 38 918 | 5/1990 |
| DE | 41 42 241 | 6/1993 |
| DE | 43 09 074 | 9/1994 |
| DE | 196 20 262 | 11/1997 |
| DE | 101 02 913 | 7/2002 |
| EP | 224 616 | 11/1987 |
| EP | 277 345 | 8/1988 |
| EP | 307 815 | 3/1989 |
| EP | 310 875 | 4/1989 |
| EP | 356 725 | 3/1990 |
| EP | 452 328 | 10/1991 |
| EP | 476 485 | 3/1992 |
| EP | 639 632 | 2/1995 |
| EP | 700 985 | 3/1996 |
| EP | 831 141 | 3/1998 |
| WO | 87/01126 | 2/1987 |
| WO | 94/24231 | 10/1994 |
| WO | 96/03367 | 2/1996 |
| WO | 96/03479 | 2/1996 |
| WO | 97/03946 | 2/1997 |
| WO | 97/23586 | 7/1997 |
| WO | 00/47698 | 8/2000 |
| WO | 01/85874 | 11/2001 |

OTHER PUBLICATIONS

Knovel Critical Tables (2nd Edition). (2003). Knovel. Online version available at: http://knovel.com/web/portal/browse/display?_EXT_KNOVEL_DISPLAY_bookid=761&VerticalID=0.*
M. Rossenbeck, Catalysts, surfactants, mineral oil additives, G. Thieme Verlag, pp. 223-229 1978.
U.S. Appl. No. 10/551,239, filed Sep. 28, 2005, Schwahnm et al.

* cited by examiner

*Primary Examiner*—Glenn A Caldarola
*Assistant Examiner*—Ming Cheung Po
(74) *Attorney, Agent, or Firm*—Oblon, Spivak, McClelland, Maier & Neustadt, L.L.P.

(57) ABSTRACT

The present invention relates to polyalkene amine formulations comprising at least one polyalkene amine in a solvent, having improved performance properties, especially improved low temperature properties; a process for preparing such formulations and the use of these formulations in fuel and lubricant compositions, in particular fuels, for improving the intake system-cleaning action of such fuels.

19 Claims, No Drawings

POLYALKENE AMINES WITH IMPROVED APPLICATIONAL PROPERTIES

The present invention relates to polyalkene amine formulations comprising at least one polyalkene amine in a solvent, having improved performance properties, especially improved low temperature properties; to a process for preparing such formulations and to the use of these formulations in fuel and lubricant compositions, especially fuels, for improving the intake system-cleaning action of such fuels.

PRIOR ART

Carburetors and intake systems of gasoline engines, and also injection systems for fuel metering, are severely contaminated by impurities which are caused by dust particles from the air, uncombusted hydrocarbon residues from the combustion chamber and the crankcase vent gases conducted into the carburetor. These residues shift the air-fuel ratio when idling and in the lower partial load range, so that the mixture becomes leaner, the combustion becomes more incomplete and therefore the proportions of uncombusted or semicombusted hydrocarbons in the exhaust gas become higher. Increasing gasoline combustion is the consequence.

It is known that these disadvantages can be avoided by using fuel additives to keep valves and carburetors or injection systems of gasoline engines clean (cf., for example: M. Rossenbeck in Katalysatoren, Tenside, Mineralöladditive [Catalysts, surfactants, mineral oil additives], Eds.: J. Falbe, U. Hasserodt, p. 223, G. Thieme Verlag, Stuttgart 1978). Such interface-active fuel additives are generally referred to as "detergents". In the field of lubricant compositions, "dispersants" are often used as interface-active additives, and some of these are also suitable for use as detergents in fuel compositions.

Polyalkene amines are some of the most widely used fuel additives. They belong to the group of the detergent additives whose action features outstanding ability to clean the engine and keep it clean, especially the fuel intake system of the engine.

Polybutyl- and polyisobutylamines, processes for their preparation and their use in fuel and lubricant compositions are disclosed, for example, by EP-A 0 244 616 and EP-A 0 277 345. These documents are explicitly incorporated herein by way of reference.

Polyalkene amines, such as the abovementioned polybutene or polyisobutene amines, are commonly produced not in substance but rather in the presence of a solvent which is inert to the reaction. This is not removed from the reaction mixture after completion of the reaction. Since it does not interfere in the combustion processes in the engine, it remains in the actual fuel additive.

However, conventional solvent-containing polyalkene amine products have problems with regard to their low temperature performance. For instance, they have a tendency to form sediments as a consequence of crystallization of paraffin components out of the solvent.

It is an object of the present invention to provide new types of polyalkene amine formulations having improved low temperature properties.

BRIEF DESCRIPTION OF THE INVENTION

We have found that this object is achieved by suitably selecting solvents to provide a polyalkene amine formulation which has distinctly improved performance properties, especially low temperature properties.

These improved low temperature properties are expressed in a lower cloud point (CP), a lower pour point (PP) and/or an improved low temperature storage stability.

Despite a change in the solvent system, it was found that, surprisingly, no changes whatsoever are required in the existing production plants or in the catalysts used with regard to the industrial scale production. At the same volume flow rate, the present invention allows the preparation of a distinctly higher amount of the polyalkene amine which is actually effective as an additive. For the same amount of additive used (polyalkene dissolved in solvent), distinctly better activities could be achieved in engine tests compared to prior art additives.

The invention relates firstly to a polyalkene amine formulation, comprising at least one polyalkene amine in a solvent, wherein the formulation has at least one of the following low temperature properties:

a) cloud point (determined to DIN ISO 3015 or DIN EN 23015) less than or equal to $-28°$ C.;
b) pour point (determined to DIN ISO 3016) less than or equal to $-27°$ C.; and/or
c) substantially no crystalline precipitates after storage at a temperature in the range from about $-10$ to $-40°$ C., for example at about $-30$ or $-35°$ C., determined after storage of from about 1 day to 6 weeks, for example 5, 10, 20 or 30 days.

The formulation preferably has a pour point in the range from $-27$ to $-55°$ C., for example from $-30$ to $-50°$ C., and/or a cloud point in the range from about $-28$ to $-51°$ C., for example from $-33$ to $-45°$ C.

The solvent preferably has a density ($15°$ C., ASTM D 4052, EN ISO 12185-1996) in the range from about 650 to 900, for example from about 720 to 820 or from 740 to 810 kg/m$^3$, and/or a viscosity ($20°$ C., ASTM D 445) in the range from about 1.0 to 5.0, for example from about 1.6 to 2.0 or from 1.7 to 1.9 mm$^2$/s.

The solvent is in particular selected from linear, branched or cyclic, substantially saturated $C_6$-$C_{20}$ hydrocarbons and mixtures thereof. "Substantially saturated" means that a minor fraction, for example <1% by weight or <0.1% by weight or <0.01% by weight of unsaturated aromatic or non-aromatic constituents may be present.

The solvent is preferably selected from
S1) at least one n- or iso-$C_{10}$-$C_{14}$ paraffin,
S2) at least one $C_{10}$-$C_{14}$ naphthene,
or mixtures thereof, in which S1 and S2 may be present in a mixing ratio of from 10:90 to 90:10.

The polyalkene moiety of the polyalkene amine present in the formulation is the polymerization product of identical or different, straight-chain or branched $C_2$-$C_6$ olefin monomers which are preferably randomly copolymerized in the polymer.

The polyalkene used to prepare the polyalkene amine has a number-average molecular weight Mn of from about 200 to 10 000, for example from about 500 to 5000 or from about 800 to 1200, or from 850 to 1100, for example about 1000.

In a particularly preferred embodiment, the polyalkene is derived from isobutene or an isobutenic monomer mixture, for example a mixture of isobutene and up to about 20% by weight of n-butene. The polyalkene is preferably a polyisobutene (PIB).

In a further preferred embodiment of the formulation according to the invention, the polyalkene amine is a polyisobutene amine (PIBA) which is derived from a polyisobutene having at least one of the following properties:
a) fraction of vinylidene double bonds of at least 70 mol %, based on polyisobutene;

b) polyisobutene polymer structure composed of at least 85% by weight of isobutene units;

c) polydispersity in the range from 1.05 to 7.

In particular, the polyalkene amine is the reaction product of a polyalkene with an amine of the general formula I

where

R$^1$ and R$^2$ are each independently H, a C$_1$-C$_{18}$-alkyl, C$_2$-C$_{18}$-alkenyl, C$_4$-C$_{18}$-cycloalkyl, C$_1$-C$_{18}$-alkylaryl, hydroxy-C$_1$-C$_{18}$-alkyl, poly(oxyalkyl), polyalkylene polyamine or a polyalkylene imine radical; or, together with the nitrogen atom to which they are bonded, are a heterocyclic ring.

The PIBA used in accordance with the invention is preferably the reaction product of the hydroformylation of reactive PIB, i.e. which fulfills at least the above feature a), and the subsequent reductive amination of the oxo product.

A significant advantage of the invention can also be seen in that the formulation may still comprise, as a solvent, the process solvent of the hydroformylation and subsequent reductive amination of reactive PIB, without adversely affecting the functionality of the additive.

A further particularly preferred embodiment of the invention relates to a PIBA formulation comprising PIBA in a mixture comprising a solvent as defined above, in which PIBA is present in a fraction of at least about 63% by weight, in particular at least about 65% by weight, for example from 65 to 99 or from 65 to 85 or from 65 to 75% by weight, based on the total weight of the mixture.

The invention further relates to fuel or lubricant comprising, in a majority of a fuel or lubricant, an effective amount of a formulation according to any of the preceding claims. For example, the formulation according to the invention may be added to a fuel in a fraction of from about 10 to 10 000, for example from about 20 to 5000 ppm. The formulations may be added to lubricants in fractions of from about 1 to 15% by weight, for example from about 2 to 10% by weight.

The invention further relates to the use of a formulation as defined above as an additive for fuel or lubricant compositions, or as an additive for printing inks; especially to the use as an additive for improving the intake system-cleaning action of a gasoline fuel.

The invention also provides additive packages comprising a formulation as defined above, optionally in combination with at least one further coadditive.

The invention also provides the use of a solvent S1, S2, or of a mixture of S1 and S2 as defined above, for improving the low temperature performance of a polyalkene amine, in particular of PIBA, as defined above.

The invention finally provides a process for preparing a polyalkene amine formulation according to the invention, where a. a polyalkene amine as defined above is dissolved in a solvent as defined above;

b. the solution is hydroformylated in a manner known per se in the presence of CO and H$_2$; and c. the resulting oxo product is aminated under hydrogenating conditions in the presence of an amine of the above formula I.

In stage a), preference is given to preparing a polyalkene solution whose solvent fraction is at most about 40% by weight, for example <39 or <35% by weight, based on the total weight of the solution.

DETAILED DESCRIPTION OF THE INVENTION

A) The Polyalkene Amine

According to the invention, the polyalkene amines used are in particular those whose polyalkene moiety is the polymerization product of identical or different, straight-chain or branched C$_2$-C$_6$ olefin monomers. Examples of suitable monomers are ethylene, propylene, 1-butene, isobutene, 1-pentene, 2-methylbutene, 1-hexene, 2-methylpentene, 3-methylpentene, 4-methylpentene. The polyalkene has a number-average molecular weight Mn of from about 200 to 10 000.

However, particularly preferred polyalkene amines are derived from polyisobutenes. Particularly suitable polyisobutenes are what are known as "highly reactive" polyisobutenes which feature a high content of terminal double bonds. Terminal double bonds are alpha-olefinic double bonds of the

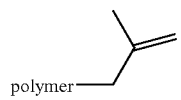

type which are also referred to together as vinylidene double bonds. Suitable highly reactive polyisobutenes are, for example, polyisobutenes which have a fraction of vinylidene double bonds of greater than 70 mol %, in particular greater than 80 mol % or greater than 85 mol %. Preference is given in particular to polyisobutenes which have uniform polymer frameworks. Uniform polymer frameworks have in particular those polyisobutenes which are composed of at least 85% by weight, preferably at least 90% by weight, and more preferably at least 95% by weight, of isobutene units. Such highly reactive polyisobutenes preferably have a number-average molecular weight in the abovementioned range. In addition, the highly reactive polyisobutenes may have a polydispersity in the range from 1.05 to 7, in particular from about 1.1 to 2.5, for example of less than 1.9 or less than 1.5. Polydispersity refers to the quotients of weight-average molecular weight Mw divided by the number-average molecular weight Mn.

Particularly suitable highly reactive polyisobutenes are, for example, the Glissopal brands from BASF AG, in particular Glissopal 1000 (Mn=1000), Glissopal V 33 (Mn=550) and Glissopal 2300 (Mn=2300) and mixtures thereof. Other number-average molecular weights may be attained in a manner which is known in principle by mixing polyisobutenes of different number-average molecular weights or by extractively enriching polyisobutenes of certain molecular weight ranges.

To prepare the polyalkene amine, the polyalkene component is aminated in a manner known per se.

A preferred process proceeds via the preparation of an oxo intermediate by hydroformylation and subsequent reductive amination in the presence of a suitable nitrogen compound.

Suitable amines are in particular compounds of the formula I, i.e. HNR$^1$R$^2$.

R$^1$ and R$^2$ may each independently be:

(1) H;

(2) a C$_1$-C$_{18}$-alkyl radical; examples of suitable alkyl radicals include straight-chain or branched radicals having from 1 to 18 carbon atoms such as methyl, ethyl, iso- or n-propyl, n-, iso-, sec- or tert-butyl, n- or isopentyl; and also n-hexyl, n-heptyl, n-octyl, n-nonyl, n-decyl, n-undecyl, n-tridecyl, n-tetradecyl, n-pentadecyl and n-hexadecyl and n-octadecyl, and also the mono- or polybranched analogs thereof; and also corresponding radicals in which the hydrocarbon chain has one or more ether bridges;
(3) a $C_2$-$C_{18}$-alkenyl radical; examples of suitable alkenyl radicals include the mono- or polyunsaturated, preferably mono- or diunsaturated analogs of the above-mentioned alkyl radicals having from 2 to 18 carbon atoms, in which the double bonds may be in any position in the hydrocarbon chain;
(4) a $C_4$-$C_{18}$-cycloalkyl radical; examples include cyclobutyl, cyclopentyl and cyclohexyl, and also the analogs thereof substituted by from 1 to 3 $C_1$-$C_4$-alkyl radicals; the $C_1$-$C_4$-alkyl radicals are, for example, selected from methyl, ethyl, iso- or n-propyl, n-, iso-, sec- or tert-butyl;
(5) a $C_1$-$C_{18}$-alkylaryl radical; where the $C_1$-$C_{18}$-alkyl group is as defined above and the aryl group is derived from a monocyclic or bicyclic fused or nonfused 4- to 7-membered, in particular 6-membered aromatic or heteroaromatic group such as phenyl, pyridyl, naphthyl and biphenylyl.
(6) a $C_2$-$C_{18}$-alkenylaryl radical; where the $C_2$-$C_{18}$-alkenyl group is as defined above and the aryl group is as defined above;
(7) a hydroxy-$C_1$-$C_{18}$-alkyl radical; where this corresponds to the analogs of the above $C_1$-$C_{18}$-alkyl radicals which have been mono- or polyhydroxylated, preferably monohydroxylated, in particular monohydroxylated in the terminal position; for example 2-hydroxyethyl and 3-hydroxypropyl;
(8) a poly(oxyalkyl) radical, hydroxylated if appropriate, which is obtainable by alkoxylating the nitrogen atom with from 2 to 10 $C_1$-$C_4$-alkoxy groups in which individual carbon atoms may, if appropriate, bear further hydroxyl groups. Preferred alkoxy groups include methoxy, ethoxy and n-propoxy groups;
(9) a polyalkylene polyamine radical of the formula

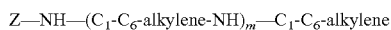

Z—NH—($C_1$-$C_6$-alkylene-NH)$_m$—$C_1$-$C_6$-alkylene where m is an integer from 0 to 5, Z is H or $C_1$-$C_6$-alkyl and $C_1$-$C_6$-alkyl represents radicals such as methyl, ethyl, iso- or n-propyl, n-, iso-, sec- or tert-butyl, n- or isopentyl; and also n-hexyl; and $C_1$-$C_6$-alkylene represents the corresponding bridged analogs of these radicals;
(10) a polyalkylene imine radical composed of from 1 to 10 $C_1$-$C_4$-alkylene imine groups, in particular ethylene imine groups;
(11) or, together with the nitrogen atom to which they are bonded, are an optionally substituted 5- to 7-membered heterocyclic ring which is optionally substituted by from one to three $C_1$-$C_4$-alkyl radicals and optionally bears one further ring heteroatom such as O or N.

Examples of suitable compounds of the formula $HNR^1R^2$ are:
ammonia
primary amines such as methylamine, ethylamine, n-propylamine, isopropylamine, n-butylamine, isobutylamine, sec-butylamine, tert-butylamine, pentylamine, hexylamine, cyclopentylamine and cyclohexylamine; and also primary amines of the formula $CH_3$—O—$C_2H_4$—$NH_2$, $C_2H_5$—O—$C_2H_4$—$NH_2$, $CH_3$—O—$C_3H_6$—$NH_2$, $C_2H_5$—O—$C_3H_6$—$NH_2$, n —$C_4H_9$—O—$C_4H_8$—$NH_2$, HO—$C_2H_4$—$NH_2$, HO—$C_3H_6$—$NH_2$ and HO—$C_4H_8$—$NH_2$;
secondary amines, for example dimethylamine, diethylamine, methylethylamine, di-n-propylamine, diisopropylamine, diisobutylamine, di-sec-butylamine, di-tert-butylamine, dipentylamine, dihexylamine, dicyclopentylamine, dicyclohexylamine and diphenylamine; and also secondary amines of the formula ($CH_3$—O—$C_2H_4$)$_2$NH, ($C_2H_5$—O—$C_2H_4$)$_2$NH, ($CH_3$—O—$C_3H_6$)$_2$NH, ($C_2H_5$—O—$C_3H_6$)$_2$NH, (n-$C_4H_9$—O—$C_4H_8$)$_2$NH, (HO—$C_2H_4$)$_2$NH, (HO—$C_3H_6$)$_2$NH and (HO—$C_4H_8$)$_2$NH;
heterocyclic amines such as pyrrolidine, piperidine, morpholine and piperazine, and also their substituted derivatives such as N—$C_1$—$C_6$-alkylpiperazines and dimethylmorpholine.
polyamines, for example $C_1$-$C_4$-alkylenediamines, di-$C_1$-$C_4$-alkylenetriamines, tri-$C_1$-$C_4$-alkylenetetramines and higher analogs;
polyethylene imines, preferably oligoethylene imines, consisting of from 1 to 10, preferably from 2 to 6 ethylene imine units. Preferred examples of suitable polyamines and polyimines are n-propylenediamine, 1,4-butanediamine, 1,6-hexanediamine, diethylenetriamine, triethylenetetramine and polyethylene imines, and also their alkylation products, for example 3-(dimethylamino)-n-propylamine, N,N-dimethylethylenediamine, N,N-diethylethylenediamine and N,N,N',N'-tetramethyldiethylenetriamine. Likewise suitable is ethylenediamine.

B) The Solvent

The solvent present in the formulations according to the invention is in particular the process solvent used in the polyalkene amine preparation, selected from linear, branched or cyclic, substantially saturated $C_6$-$C_{20}$, preferably $C_8$-$C_{16}$, in particular $C_{10}$-$C_{14}$ hydrocarbons and mixtures thereof. This definition includes in particular n- and isoparaffins of this chain length and also cyclic compounds having this carbon number derived from the crude oil naphthene fraction.

Commonly, the paraffinic or naphthenic solutions used are not pure substances but rather substance mixtures.

In particular, the solvent is selected from
S1) at least one n- or iso-$C_{10}$-$C_{14}$ paraffin,
S2) at least one $C_{10}$-$C_{14}$ naphthene,
or mixtures thereof in which S1 and S2 may be present in a mixing ratio of from 10:90 to 90:10.

Nonlimiting examples of suitable paraffinic solvents include those obtainable under the trade name MIHAGOL from BP Germany. Mention should be made in particular of MIHAGOL M having an n-paraffin fraction of at least 99% by weight and comprising paraffins having a chain length of 11, 12 and 13 carbon atoms in predominant fractions and containing secondary fractions of $C_{14}$ and $C_9$ paraffins or shorter-chain paraffins.

Nonlimiting examples of suitable naphthenic solvents include those which are obtainable under the trade name LIAV from FORTUM OIL AND GAS. Mention should be made in particular of NESSOL LIAV 230 which comprises saturated cyclic aliphatics having a carbon number of from 10 to 14 in predominant fractions.

The solvents or mixtures thereof are used in an amount which is sufficient to confer on the formulation the above-described advantageous low temperature performance.

C) Preparation of the Formulation

The preparation of the polyalkene amine formulation preferably corresponds substantially to the synthesis of polyalkene amine. This is to be illustrated in detail with reference to the synthesis of a polyisobutene amine. The preparation is effected in a similar manner to the process described in EP-A-0 244 616 or 0 277 345, which is explicitly incorporated herein by way of reference.

To this end, polyisobutene is hydroformylated in the presence of a rhodium or a cobalt catalyst, for example rhodium dicarbonyl acetylacetonate, in the presence of CO and hydrogen at a temperature in the range from 80 to 200° C. and a CO/hydrogen pressure of up to 600 bar, and a hydrogenating amination of the oxo product (alcohol and/or aldehyde) formed with the desired nitrogen compound, for example ammonia, is carried out. The amination is appropriately carried out at temperatures of from 80 to 200° C. and pressures of up to 600 bar. Before commencing the reaction, a solvent of the above-described type is added to the polyisobutene in an amount which is sufficient to attain the desired low temperature performance of the amine end product in the solvent.

D) Further Additive Components

The polyalkene amine formulations according to the invention may be added to the fuels or lubricants to be additized individually or in a mixture with further effective additive components (coadditives).

Examples include additives other than the above polyalkene amines which have detergent action and/or have valve seat wear-inhibiting action (hereinafter referred to as detergent additives). This detergent additive has at least one hydrophobic hydrocarbon radical having a number-average molecular weight (Mn) of from 85 to 20 000 and at least one polar moiety selected from:

(a) mono- or polyamino groups having up to 6 nitrogen atoms, of which at least one nitrogen atom has basic properties;
(b) nitro groups, if appropriate in combination with hydroxyl groups;
(c) hydroxyl groups in combination with mono- or polyamino groups, in which at least one nitrogen atom has basic properties;
(d) carboxyl groups or their alkali metal or their alkaline earth metal salts;
(e) sulfonic acid groups or their alkali metal or alkaline earth metal salts;
(f) polyoxy-$C_2$- to -$C_4$-alkylene groups which are terminated by hydroxyl groups, mono- or polyamino groups, in which at least one nitrogen atom has basic properties, or by carbamate groups;
(g) carboxylic ester groups;
(h) moieties derived from succinic anhydride and having hydroxyl and/or amino and/or amido and/or imido groups; and/or
(i) moieties obtained by Mannich reaction of substituted phenols with aldehydes and mono- or polyamines.

The hydrophobic hydrocarbon radical in the above detergent additives which ensures the adequate solubility in the fuel has a number-average molecular weight (Mn) of from 85 to 20 000, especially from 113 to 10 000, in particular from 300 to 5000. Typical hydrophobic hydrocarbon radicals, especially in conjunction with the polar moieties (a), (c), (h) and (i), include polypropenyl, polybutenyl and polyisobutenyl radical each having Mn=from 300 to 5000, especially from 500 to 2500, in particular from 700 to 2300.

Examples of the above groups of detergent additives include the following:

Additives comprising mono- or polyamino groups (a) are preferably polyalkenemono- or polyalkenepolyamines based on polypropene or conventional (i.e. having predominantly internal double bonds) polybutene or polyisobutene having Mn=from 300 to 5000. When polybutene or polyisobutene having predominantly internal double bonds (usually in the beta and gamma position) are used as starting materials in the preparation of the additives, a possible preparative route is by chlorination and subsequent amination or by oxidation of the double bond with air or ozone to give the carbonyl or carboxyl compound and subsequent amination under reductive (hydrogenating) conditions. The amines used here for the amination may be, for example, ammonia, monoamines or polyamines, such as dimethylaminopropylamine, ethylenediamine, diethylenetriamine, triethylenetetramine or tetraethylenepentamine. Corresponding additives based on polypropene are described in particular in WO-A-94/24231.

Further preferred additives comprising monoamino groups (a) are the hydrogenation products of the reaction products of polyisobutenes having an average degree of polymerization P of from 5 to 100 with nitrogen oxides or mixtures of nitrogen oxides and oxygen, as described in particular in WO-A-97/03946.

Further preferred additives comprising monoamino groups (a) are the compounds obtainable from polyisobutene epoxides by reaction with amines and subsequent dehydration and reduction of the amino alcohols, as described in particular in DE-A-196 20 262.

Additives comprising nitro groups (b), if appropriate in combination with hydroxyl groups, are preferably reaction products of polyisobutenes having an average degree of polymerization P of from 5 to 100 or from 10 to 100 with nitrogen oxides or mixtures of nitrogen oxides and oxygen, as described in particular in WO-A-96/03367 and WO-A-96/03479. These reaction products are generally mixtures of pure nitropolyisobutenes (e.g. alpha,beta-dinitropolyisobutene) and mixed hydroxynitropolyisobutenes (e.g. alpha-nitro-beta-hydroxypolyisobutene).

Additives comprising hydroxyl groups in combination with mono- or polyamino groups (c) are in particular reaction products of polyisobutene epoxides obtainable from polyisobutene having preferably predominantly terminal double bonds and Mn from 300 to 5000, with ammonia or mono- or polyamines, as described in particular in EP-A-476 485.

Additives comprising carboxyl groups or their alkali metal or alkaline earth metal salts (d) are preferably copolymers of $C_2$-$C_{40}$-olefins with maleic anhydride which have a total molar mass of from 500 to 20 000 and of whose carboxyl groups some or all have been converted to the alkali metal or alkaline earth metal salts and any remainder of the carboxyl groups has been reacted with alcohols or amines. Such additives are disclosed in particular by EP-A-307 815. Such additives serve mainly to prevent valve seat wear and can, as described in WO-A-87/01126, advantageously be used in combination with customary fuel detergents such as poly(iso) butene amines or polyether amines.

Additives comprising sulfonic acid groups or their alkali metal or alkaline earth metal salts (e) are preferably alkali metal or alkaline earth metal salts of an alkyl sulfosuccinate, as described in particular in EP-A-639 632. Such additives serve mainly to prevent valve seat wear and can be used advantageously in combination with customary fuel detergents such as poly(iso)butene amines or polyether amines.

Additives comprising polyoxy-$C_2$-$C_4$-alkylene moieties (f) are preferably polyethers or polyether amines which are obtainable by reaction of $C_2$- to $C_{60}$-alkanols, $C_6$- to $C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group and, in the case of the polyether amines, by subsequent reductive amination with ammonia, monoamines or polyamines. Such products are described in particular in EP-A-310 875, EP-A-356 725, EP-A-700 985 and U.S. Pat. No. 4,877,416. In the case of polyethers, such products also have carrier oil properties. Typical examples of these are tridecanol butoxylates, isotridecanol butoxylates, isononylphenol butoxylates and polyisobutenol butoxylates and propoxylates and also the corresponding reaction products with ammonia.

Additives comprising carboxylic ester groups (g) are preferably esters of mono-, di- or tricarboxylic acids with long-chain alkanols or polyols, in particular those having a minimum viscosity of 2 mm²/s at 100° C., as described in particular in DE-A-38 38 918. The mono-, di- or tricarboxylic acids used may be aliphatic or aromatic acids, and particularly suitable ester alcohols or ester polyols are long-chain representatives having, for example, from 6 to 24 carbon atoms. Typical representatives of the esters are adipates, phthalates, isophthalates, terephthalates and trimellitates of isooctanol, of isononanol, of isodecanol and of isotridecanol. Such products also have carrier oil properties.

Additives comprising moieties derived from succinic anhydride and having hydroxyl and/or amino and/or amido and/or imido groups (h) are preferably corresponding derivatives of polyisobutenylsuccinic anhydride which are obtainable by reacting conventional or highly reactive polyisobutene having Mn=from 300 to 5000 with maleic anhydride by a thermal route or via the chlorinated polyisobutene. Particular interest attaches to derivatives with aliphatic polyamines such as ethylenediamine, diethylenetriamine, triethylenetetramine or tetraethylenepentamine. Such gasoline fuel additives are described in particular in U.S. Pat. No. 4,849,572.

Additives comprising moieties obtained by Mannich reaction of substituted phenols with aldehydes and mono- or polyamines (i) are preferably reaction products of polyisobutene-substituted phenols with formaldehyde and mono- or polyamines such as ethylenediamine, diethylenetriamine, triethylenetetramine, tetraethylenepentamine or dimethylaminopropylamine. The polyisobutenyl-substituted phenols may stem from conventional or highly reactive polyisobutene having Mn=from 300 to 5000. Such "polyisobutene-Mannich bases" are described in particular in EP-A-831 141.

For a more precise definition of the gasoline fuel additives detailed individually, reference is explicitly made here to the disclosures of the abovementioned prior art documents.

Carrier Oils and Further Components:

The additive formulations according to the invention may additionally be combined with yet further customary components and additives. Mention should be made here primarily of carrier oils having no marked detergent action.

Suitable mineral carrier oils are the fractions obtained in crude oil processing, such as kerosene or naphtha, brightstock or base oils having viscosities, for example, from the SN 500-2000 class; and also aromatic hydrocarbons, paraffinic hydrocarbons and alkoxyalkanols. Likewise useful is a fraction which is obtained in the refining of mineral oil and is known as "hydrocrack oil" (vacuum distillate cut having a boiling range of from about 360 to 500° C., obtainable from natural mineral oil which has been catalytically hydrogenated under high pressure and isomerized and also deparaffinized). Likewise suitable are mixtures of abovementioned mineral carrier oils.

Examples of synthetic carrier oils which are useful in accordance with the invention are selected from: polyolefins (poly-alpha-olefins or poly(internal olefin)s), (poly)esters, (poly)alkoxylates, polyethers, aliphatic polyether amines, alkylphenol-started polyethers, alkylphenol-started polyether amines and carboxylic esters of long-chain alkanols.

Examples of suitable polyolefins are olefin polymers having Mn=from 400 to 1800, in particular based on polybutene or polyisobutene (hydrogenated or nonhydrogenated).

Examples of suitable polyethers or polyether amines are preferably compounds comprising polyoxy-$C_2$-$C_4$-alkylene moieties which are obtainable by reacting $C_2$-$C_{60}$-alkanols, $C_6$-$C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group, and, in the case of the polyether amines, by subsequent reductive amination with ammonia, monoamines or polyamines. Such products are described in particular in EP-A-310 875, EP-A-356 725, EP-A-700 985 and U.S. Pat. No. 4,877,416. For example, the polyether amines used may be poly-$C_2$-$C_6$-alkylene oxide amines or functional derivatives thereof. Typical examples thereof are tridecanol butoxylates or isotridecanol butoxylates, isononylphenol butoxylates and also polyisobutenol butoxylates and propoxylates, and also the corresponding reaction products with ammonia.

Examples of carboxylic esters of long-chain alkanols are in particular esters of mono-, di- or tricarboxylic acids with long-chain alkanols or polyols, as described in particular in DE-A-38 38 918. The mono-, di- or tricarboxylic acids used may be aliphatic or aromatic acids; suitable ester alcohols or polyols are in particular long-chain representatives having, for example, from 6 to 24 carbon atoms. Typical representatives of the esters are adipates, phthalates, isophthalates, terephthalates and trimellitates of isooctanol, isononanol, isodecanol and isotridecanol, for example di-(n- or isotridecyl) phthalate.

Further suitable carrier oil systems are described, for example, in DE-A-38 26 608, DE-A41 42 241, DE-A43 09 074, EP-A-0 452 328 and EP-A-0 548 617, which are explicitly incorporated herein by way of reference.

Examples of particularly suitable synthetic carrier oils are alcohol-started polyethers having from about 5 to 35, for example from about 5 to 30, $C_3$-$C_6$-alkylene oxide units, for example selected from propylene oxide, n-butylene oxide and isobutylene oxide units, or mixtures thereof. Nonlimiting examples of suitable starter alcohols are long-chain alkanols or phenols substituted by long-chain alkyl in which the long-chain alkyl radical is in particular a straight-chain or branched $C_6$-$C_{18}$-alkyl radical. Preferred examples include tridecanol and nonylphenol.

Further suitable synthetic carrier oils are alkoxylated alkylphenols, as described in DE-A-10 102 913.6.

Further customary additives are corrosion inhibitors, for example based on ammonium salts of organic carboxylic acids, said salts tending to form films, or of heterocyclic aromatics for nonferrous metal corrosion protection; antioxidants or stabilizers, for example based on amines such as p-phenylenediamine, dicyclohexylamine or derivatives thereof or of phenols such as 2,4-di-tert-butylphenol or 3,5-di-tert-butyl-4-hydroxyphenylpropionic acid; demulsifiers; antistats; metallocenes such as ferrocene; methylcyclopentadienylmanganese tricarbonyl; lubricity additives such as certain fatty acids, alkenylsuccinic esters, bis(hydroxyalkyl) fatty amines, hydroxyacetamides or castor oil; and also markers. Amines are also, if appropriate, added to lower the pH of the fuel.

The components and additives may be added to the fuel or lubricant individually or as a concentrate prepared beforehand (additive package) together with the polyalkene amine formulations according to the invention.

The detergent additives mentioned having the polar moieties (a) to (i) are added to the fuel typically in an amount of from 10 to 5000 ppm by weight, in particular from 50 to 1000 ppm by weight. The other components and additives mentioned are, where desired, added in amounts customary for this purpose.

E) Fuels and Lubricants

The additive compositions according to the invention are useful in all conventional gasoline fuels, as described, for example, in Ullmann's Encyclopedia of Industrial Chemistry, 5th Ed. 1990, Volume A16, p. 719 ff. They are also used for additizing diesel fuel, kerosene and jet fuel.

For example, it is possible to use them in a gasoline fuel having a maximum aromatics content of 60% by volume, for example a maximum of 42% by volume, and a maximum sulfur content of 2000 ppm by weight, for example a maximum of 150 ppm by weight.

The aromatics content of the gasoline fuel is, for example, from 10 to 50% by volume, for example from 30 to 42% by volume, in particular from 32 to 40% by volume. The sulfur content of the gasoline fuel is, for example, from 2 to 500 ppm by weight, for example from 5 to 150 ppm by weight, or from 10 to 100 ppm by weight.

In addition, the gasoline fuel may have, for example, an olefin content of up to 50% by volume, for example from 6 to 21% by volume, in particular from 7 to 18% by volume; a benzene content of up to 5% by volume, for example from 0.5 to 1.0% by volume, in particular from 0.6 to 0.9% by volume, and/or an oxygen content of up to 25% by volume, for example up to 10% by weight, or from 1.0 to 2.7% by weight, in particular from 1.2 to 2.0% by weight.

Examples of such gasoline fuels are in particular those which simultaneously have a maximum aromatics content of 38% by volume, a maximum olefin content of 21% by volume, a maximum sulfur content of 50 ppm by weight, a maximum benzene content of 1.0% by volume and an oxygen content of from 1.0 to 2.7% by weight.

The contents of alcohols and ethers in the gasoline fuel may vary over a wide range. Examples of typical maximum contents are 15% by volume for methanol, 65% by volume for ethanol, 20% by volume for isopropanol, 15% by volume for tert-butanol, 20% by volume for isobutanol and 30% by volume for ethers having 5 or more carbon atoms in the molecule.

The maximum summer vapor pressure of the gasoline fuel is typically 70 kPa, in particular 60 kPa (each at 37° C.).

The RON of the gasoline fuel is generally from 75 to 105. A typical range for the corresponding MON is from 65 to 95.

The specifications mentioned are determined by customary methods (DIN EN 228).

Examples of lubricants which can be additized in accordance with the invention include oils and greases for vehicles or drive units, in particular engine oils, gearbox oils and turbine oils of customary composition and specification.

The invention will now be illustrated in detail with the aid of the following examples:

EXPERIMENTAL SECTION

Preparative Example 1

Preparation of a Polyisobutene Amine Formulation Having Improved Cloud Point

Polyisobutene amine (PIBA) prepared according to EP-A-0 244 616 is admixed with MIHAGOL M in the PIBA/solvent mixing ratio specified there in Example 1 (62.5:37.5 parts by weight).

In the same manner, an inventive formulation was prepared, except that a mixture of 66.7 parts of PIBA and 33.3 parts of MIHAGOL M was used.

Cloud point and pour point were measured for both formulations. The results are summarized in the following Table A:

TABLE A

|  | Prior art | Invention |
|---|---|---|
| Cloud point | −27.6° C. | −29.4° C. |
| Pour point | −27° C. | −27° C. |

Surprisingly, a significant improvement in cloud point could be achieved in accordance with the invention.

Preparative Example 2

Preparation of a Polyisobutene Amine Formulation Having Improved Low Temperature Properties 500 g of polyisobutene having a molecular weight Mn of 1000, 269.2 g of a solvent composed of (80% by weight of MIHAGOL M and 20% by weight of LIAV 230) and 2.8 g of cobalt octacarbonyl are heated at 185° C. for 5 h in a 2.5 l autoclave having a lift stirrer with stirring under 280 bar of 1:1 $CO/H_2$. Subsequently, the mixture is cooled to room temperature, the catalyst is removed with 400 ml of 10% aqueous acetic acid and the mixture washed to neutrality. The resulting oxo product is treated with 1 l of ammonia, 300 g of ethanol and 100 g of Raney cobalt in a 5 l roller autoclave under a hydrogen pressure of 200 bar at 180° C. for 5 h. After the mixture has been cooled, the catalyst is filtered off, excess ammonia is evaporated off and the solvent is distilled off.

The polyisobutene used is a highly reactive polyisobutene according to DE-A-2,702,604 having a fraction of terminal double bonds of more than 70 mol %.

The improved polyisobutene amine prepared in this way ("novel PIBA", PIBA fraction 65% by weight) was compared with a known PIBA formulation ("old PIBA") prepared in accordance with EP-A-0 244 616 (PIBA fraction 53% by weight) with regard to pour point and storage stability at −10 and −35° C. The results are compiled in the following Table B.

TABLE B

|  | Old PIBA | Novel PIBA |
|---|---|---|
| Pour point | −30° C. | −33° C. |
| Storage stability at |  |  |
| −10° C. | Clear, fluid | Clear, fluid |
| −35° C. | Crystalline precipitates | Clear, fluid, no precipitate |

For the product according to the invention, a surprisingly distinct improvement in the pour point and also in the storage stability could thus be achieved.

Preparative Example 3

Preparation of a Polyisobutene Amine Formulation Having Improved Low Temperature Properties Preparative Example 1 was repeated, except that the solvent used was MIHAGOL M and/or LIAV 230 in various mixing ratios. The polyisobutene amine polymer to solvent mixing ratio in the end reaction product is 66:34. Pour point and storage stability of the resulting product were determined for the different batches. The results are compiled in the following Table C:

TABLE C

| | Mihagol:LIAV ratio[1] | | | | |
|---|---|---|---|---|---|
| | 100:0 | 80:20 | 70:30 | 50:50 | 0:100 |
| Pour point | −27° C. | −33° C. | −36° C. | −39° C. | −51° C. |
| Storage stability at −35° C. | Many crystalline precipitates | Few crystalline precipitates | Clear, fluid | Clear, fluid | Clear, fluid |

[1])Weight ratio

The results show that suitable variation of the solvent enables further surprisingly significant improvements in the storage stability.

We claim:

1. A polyalkene amine formulation, comprising:
   at least one polyalkene amine in a solvent,
   wherein the formulation has at least one of the following low temperature properties:
   a) a cloud point less than or equal to −28° C. determined according to DIN ISO 3015 or DIN EN 23015;
   b) a pour point less than or equal to −27° C. determined according to DIN ISO 3016; and/or
   c) no crystalline precipitates after storage at a temperature in the region of about −35° C.;
   wherein the solvent is selected from mixtures of:
   S1) at least one n- or iso-$C_{10}$-$C_{14}$ paraffin,
   S2) at least one $C_{10}$-$C_{14}$ naphthene; and
   wherein S1 and S2 are present in mixing ratio of from 10:90 to 90:10.

2. The formulation according to claim 1, wherein the pour point ranges from about −27 to −55° C. and/or the cloud point ranges from about −28 to −51° C.

3. The formulation according to claim 1, wherein the solvent has
   a density at 15° C. according to ASTM D 4052 and EN ISO 12185-1996 in the range from about 650 to 900 kg/m$^3$, and/or
   a viscosity at 20° C. according to ASTM D 445 in the range from about 1.0 to 5.0 mm$^2$/s.

4. The formulation according to claim 1, wherein the polyalkene moiety of the polyalkene amine is a polymerization product of identical or different, straight-chain or branched $C_2$-$C_6$ olefin monomers.

5. The formulation according to claim 4, wherein the polyalkene moiety of the polyalkene amine has a number-average molecular weight Mn of from about 200 to 10 000.

6. The formulation according to claim 5, wherein the polyalkene moiety of the polyalene amine is derived from isobutene or an isobutenic monomer mixture.

7. The formulation according to claim 6, wherein the polyalkene moiety of the polyalene amine is a polyisobutene.

8. The formulation according to claim 1, wherein the polyalkene amine is a polyisobutene amine which is derived from a polyisobutene having at least one of the following properties:
   a) a fraction of vinylidene double bonds of at least 70 mol %, based on polyisobutene;
   b) a polyisobutene polymer structure comprises at least 85% by weight of isobutene units; and
   c) a polydispersity in the range from 1.05 to 7.

9. The formulation according to claim 1, wherein the polyalkene amine is a reaction product of a polyalkene with an amine of the following general formula I:

$$HNR^1R^2 \quad (I)$$

wherein
$R^1$ and $R^2$ are each independently H, a $C_1$-$C_{18}$-alkyl, $C_2$-$C_{18}$-alkenyl, $C_4$-$C_{18}$-cycloalkyl, $C_1$-$C_{18}$-alkylaryl, hydroxy-$C_1$-$C_{18}$-alkyl, poly(oxyalkyl), polyalkylene polyamine or a polyalkylene amine radical; or, together with the nitrogen atom to which they are bonded, are a heterocyclic ring.

10. The formulation according to claim 1, wherein the polyalkene amine is a polyisobutene amine is the reaction product of a hydroformylation and subsequent reductive amination of reactive polyisobutene.

11. The formulation according to claim 1, wherein the solvent is the process solvent of hydroformylation and subsequent reductive amination of reactive polyisobutene.

12. A polyisobutene formulation, comprising:
   polyisobutene amine in a mixture comprising
      a solvent,
      wherein polyisobutene amine is present in a fraction of at least about 63% by weight, based on a total weight of the mixture;
   wherein the solvent has
   a density at 15° C. according to ASTM D 4052 and EN ISO 12185-1996 in the range from about 650 to 900 kg/m$^3$, and/or
   a viscosity at 20° C. according to ASTM D 445 in the range from about 1.0 to 5.0 mm$^2$/s;
   wherein the solvent is selected from mixtures of:
   S1) at least one n- or iso-$C_{10}$-$C_{14}$ paraffin,
   S2) at least one $C_{10}$-$C_{14}$ naphthene; and
   wherein S1 and S2 are present in a mixing ratio of from 10:90 to 90:10.

13. A fuel or lubricant composition, comprising:
   in a majority of a fuel or lubricant, an amount, effective as an additive, of a formulation according to claim 1.

14. An printing ink, comprising:
   as an additive the formulation according to claim 1.

15. A method for improving the intake system-cleaning action of a gasoline fuel, comprising:
   adding the formulation according to claim 1 to a gasoline fuel, to obtain a mixture; and
   contacting the mixture with said intake system.

16. An additive package, comprising:
   a formulation according to claim 1, optionally in combination with at least one further coadditive.

17. A method for improving the low temperature performance of polyisobutene amine, comprising:
   adding a mixture of solvent S1 and S2 to polyisobutene amine;
   wherein
   S1) is at least one n- or iso-$C_{10}$-$C_{14}$ paraffin,
   S2) is at least one $C_{10}C_{14}$ naphthene;
   wherein S1 and S2 are present in a mixing ratio of from 10:90 to 90:10.

18. A process for preparing a polyalkene amine formulation according to claim 1, wherein a) dissolving a polyalkene in a solvent mixture, to obtain a solution;
   wherein said polyalkene is a polymerization product of identical or different, straight-chain or branched $C_2$-$C_6$ olefin monomers;
   wherein said solvent mixture comprises
     S1) at least one n- or iso-$C_{10}$-$C_{14}$ paraffin,
     S2) at least one $C_{10}$-$C_{14}$ naphthene; and
     wherein S1 and S2 are present in a mixing ratio of from 10:90 to 90:10;
b) hydroformylating the solution in the presence of CO and $H_2$, to obtain an oxo product; and
c) aminating said oxo product under hydrogenating conditions in the presence of an amine of the following formula I $$HNR^1R^2 \quad (I)$$

wherein
  $R^1$ and $R^2$ are each independently H, a $C_1$-$C_{18}$-alkyl, $C_2$-$C_{18}$-alkenyl, $C_4$-$C_{18}$-cycloalkyl, $C_1$-$C_{18}$-alkylaryl, hydroxy-$C_1$-$C_{18}$-alkyl, poly(oxyalkyl), polyalkylene polyamine or a polyalkylene imine radical; or, together with the nitrogen atom to which they are bonded, are a heterocyclic ring.

19. The process according to claim 18, wherein the solution in stage a) has solvent fraction of at most 40% by weight based on a total weight of the solution.

* * * * *